Patented Dec. 8, 1942

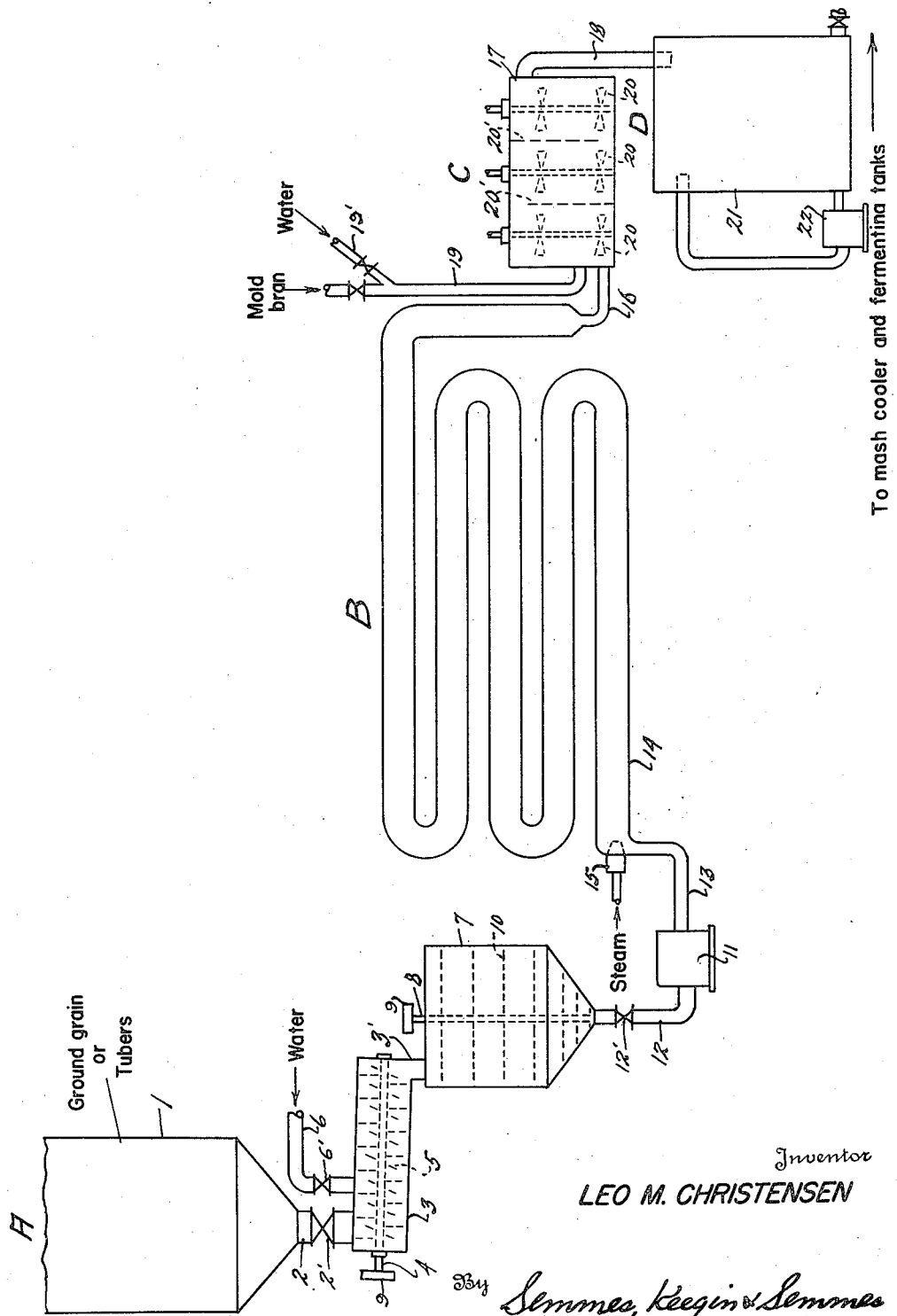

2,304,679

UNITED STATES PATENT OFFICE 2,304,679

APPARATUS FOR SACCHARIFYING STARCHY MATERIALS

Leo M. Christensen, Moscow, Idaho, assignor to National Agrol Company, Inc., New York, N. Y., a corporation of Delaware Application October 2, 1940, Serial No. 359,432

4 Claims. (Cl. 195—138)

Generically this application relates to an apparatus for saccharifying starchy materials, and more especially to an apparatus provided with means for suddenly chilling heated mash during the saccharification of starchy materials.

In my co-pending application Serial No. 359,433, filed Octiber 2, 1940, I have disclosed a process of saccharifying starchy materials in which the mash is suddenly chilled after cooking. The present application discloses one apparatus which may be used in this process.

The usual apparatus for saccharifying starchy materials require approximately one hour for cooling the cooked mash to saccharification temperature. Moreover, these apparatus usually require a rehandling of the material during the process.

One of the objects of my invention is to provide an apparatus which will overcome the disadvantages of the prior art.

Another object of my invention is to provide an apparatus in which the starchy material may be converted without the necessity for rehandling.

A further object of my invention is to provide an apparatus in which the mash may be suddenly chilled after the cooking step.

With these and other objects in view, my invention embraces broadly the concept of providing an apparatus in which the ground starchy material may be reduced to a slurry, cooked, suddenly chilled and aerated in one continuous step without rehandling. This apparatus is of simple construction and occupies a relatively small space.

In the drawing:

Figure 1 discloses a diagrammatic view of the apparatus.

As shown in the drawing, the apparatus which forms the basis of this invention comprises a feeding unit A, a cooking unit B, a chilling unit C, and an aerating unit D. The feeding unit A consists of a container 1 which is of suitable size to hold ground grain or tubers. This container 1 is operatively connected by a conduit 2 containing a valve 2' to a mixing unit 3 in which is horizontally mounted a rotatable shaft 4 provided with impellers 5. Water is admitted into this unit through a pipe 6 controlled by a valve 6'.

The unit 3 is connected by a conduit 3' with a mingling device 7 in which is vertically mounted a rotatable shaft 8 provided with impellers 10. Rigidly mounted on shafts 4 and 8 are pulleys 9 which are driven by an external power unit which is not shown.

The mingler 7 is operatively connected to a power pump 11 by means of a conduit 12 provided with a valve 12'. This pump may be of any suitable type and is designed to pump the mash through a pipe 13 of the cooker unit B. The cooker B consists of a coiled pipe 14 which is of a suitable diameter and length to hold the mash for the required cooking time of from thirty to sixty minutes. At the inlet opening of the coiled pipe 14 is a steam jet 15 which is of suitable size to raise the temperature of the mash within the coiled pipe 14 from 100 to 110° C. The other extremity of the pipe 14 is reduced and empties into the chilling unit C as indicated at 16.

The chilling unit C consists of a housing 17 which is operatively connected by a pipe 18 to the aerating unit D. Connected with the housing 17 is a pipe 19 through which water and material having diastatic properties, such as bran mold, may be conveyed to the mash. The housing is also provided with a plurality of vertically mounted rotating minglers 20 between baffles 20'.

The aerating unit D consists of an open tank 21 to which is operatively connected a pump 22 which is designed to recirculate the contents of the tank 21. The tank 21 is also connected to a suitable mash cooler, which is not shown, through which the mash may be pumped to the fermenter where it is inoculated.

In operation, the selected starchy material, such as ground grain or ground tubers, is placed in a container 1 and the required amount is carried by gravity through the conduit 2 to the mixer 3. At the same time, a sufficient quantity of water is admitted to the mixer 3 through the pipe 6 to produce a mash of approximately double the concentration desired for the fermentation phase of the process. The water admitted should be of a temperature below that at which starch gelatinizes.

As the ground starchy material and water is admitted to the mixer 3, it is formed into a slurry by the action of the impellers 5 and then passes through the conduit 3' into the mingler 7 where the action of the impellers 10 completes the mixing.

When the ingredients have been thoroughly mixed, the slurry is admitted into the conduit 12 where it passes into the pump 11 which forces it through the conduit 13 into the heating pipe 14 which forms a part of the cooker B. At the same time steam is admitted through the steam jet 15 into the pipe 14 and the temperature of the mash is raised from 100 to 110° C.

The mash requires from thirty to sixty minutes to pass through the pipe 14 and then is emptied into the chilling unit C. At the same time a mixture of water and diastatic material is also admitted to the unit C through the conduit 19. In this step sufficient water is admitted to reduce the mash to a suitable consistency for fermentation and the water has been previously chilled to a temperature which will instantaneously reduce the temperature of the mash from approximately 100° C. to the desired saccharifying temperature which is usually approximately 55° C. Sufficient diastatic material, such as mold bran, to convert the starch into fermentable carbohydrates has been previously added to the water.

As soon as the mash and water come into contact, they are immediately mixed by the impellers 20. This causes instantaneous cooling and also brings the diastatic agent into contact with the starchy material.

The mixture then passes through the pie 18 into the container 21 where it is agitated and aerated from time to time by action of the centrifugal pump 22. At the end of this period, the mash is pumped through a suitable mash cooler, which is not shown, to the fermenter where it is inoculated.

While for purposes of illustration I have shown my invention as applied to one specific structure, it is obvious that changes can be made in the structural details and the position of these structural units may be varied without departing from the spirit of the invention.

I claim:

1. An apparatus for converting starchy materials into fermentable carbohydrates comprising a container for the starchy material, a conduit extending from the container to a housing, a shaft rotatably mounted in the housing, a plurality of impellers mounted on the shaft, means to introduce water into the housing, means connecting said housing to the inner extremity of a coiled pipe of large diameter, the outer extremity of said pipe being constricted to form a reduced portion, a pressure pump operatively connected to said means, a steam conduit connected to the pipe at a point adjacent its inner extremity, said reduced extremity of the pipe communicating with a second housing, a liquid supply conduit entering the housing at a point adjacent the said extremity, a plurality of shafts rotatably mounted in the housing in parallel relation, a plurality of impellers mounted on each shaft, and a baffle extending between each of the said shafts, said baffles being mounted on the interior of the said housing.

2. An apparatus for converting starchy materials into fermentable carbohydrates comprising a container for the starchy material, a conduit extending from the container to a housing, a shaft rotatably mounted in the housing, a plurality of impellers mounted on the shaft, means to introduce water into the housing, means connecting said housing to the inner extremity of a coiled pipe of large diameter, the outer extremity of said pipe being constricted to form a reduced portion, a pressure pump operatively connected to said means, a steam conduit connected to the pipe at a point adjacent its inner extremity, said reduced extremity of the pipe communicating with a second housing, a liquid supply conduit entering the housing at a point adjacent the said extremity, a plurality of shafts rotatably mounted in the housing in parallel relation, a plurality of impellers mounted on each shaft, a baffle extending between each of the said shafts, said baffles being mounted on the interior of said housing, a conduit connected to the said housing at a point opposite that communicating with the said reduced portion of the pipe, said conduit connecting the housing to a tank, a pipe positioned exteriorly of the said tank, one extremity of the pipe communicating with the lower portion of the tank and the other extremity communicating with the upper portion of the tank, and a pressure pump interposed between the said extremities of the pipe.

3. An apparatus for converting starchy materials into fermentable carbohydrates comprising a container for the starchy material, a conduit extending from the container to a housing, a shaft rotatably mounted in the housing, a plurality of impellers mounted on the shaft, means to introduce water into the housing, said housing being connected to a tank, a shaft rotatably mounted in the tank, impellers mounted on the said shaft, power means to drive the shafts mounted in the said housing and tank, a conduit connecting the said tank to the inner extremity of the coiled pipe of large diameter, the outer extremity of said pipe being constricted to form a reduced portion, a pressure pump operatively connected to said conduit, a steam conduit connected to the pipe at a point adjacent its inner extremity, said reduced extremity of the pipe communicating with a second housing, a liquid supply conduit entering the housing at a point adjacent the said extremity, a plurality of shafts rotatably mounted in the housing in parallel relation, a plurality of impellers mounted on each shaft, a baffle extending between each of the said shafts, said baffles being mounted on the interior of said housing, a conduit connected to the said housing at a point opposite that communicating with the said reduced portion of the pipe, said conduit connecting the housing to a tank, a pipe positioned exteriorly of the said tank, one extremity of the pipe communicating with the lower portion of the tank and the other extremity communicating with the upper portion of the tank, and a pressure pump interposed between the said extremities of the pipe.

4. An apparatus for converting starchy materials into fermentable carbohydrates comprising a container for the starchy material, a conduit extending from the container to a housing, mixing means mounted in the housing, means to introduce water into the housing, means connecting said housing with the inner extremity of a coiled pipe of large diameter, the other extremity of said pipe being constricted to form a reduced portion, a steam conduit connected to the pipe adjacent its inner extremity, said reduced extremity of the pipe communicating with a second housing, a liquid supply conduit entering the housing at a point adjacent the said reduced extremity, and a plurality of mixing means mounted in the housing in spaced relation.

LEO M. CHRISTENSEN.